2,887,393
REFRACTORY BODIES CONTAINING BORON NITRIDE

Kenneth M. Taylor, Lewiston, N.Y., assignor to The Carborundum Company, Niagara Falls, N.Y., a corporation of Delaware No Drawing. Application March 12, 1956
Serial No. 570,666

8 Claims. (Cl. 106—44)

This invention relates to articles of manufacture and to compositions and methods for making them. More particularly, it relates to bonded bodies or shapes composed essentially of boron nitride, with or without a silicon carbide filler, and a silicon carbide bond, and methods for making the same.

This application is a continuation-in-part application of my application Serial No. 288,552, filed May 17, 1952, now abandoned.

There is a constant search for new compositions or bodies which will possess unexpected combinations of properties essential to or generally found to be desirable in specific fields of use. The boron nitride bodies of the present invention in which boron nitride, with or without a silicon carbide filler, is bonded by silicon carbide, possess certain combinations of properties and characteristics which render them of considerable value, and they offer outstanding possibilities in a number of fields of use. It is, therefore, to be understood that the silicon carbide bonded boron nitride bodies hereinafter more fully described are not to be considered as restricted to any particular field of use. However, their outstanding characteristics as refractory materials are particularly worthy of note and make them especially suitable for a number of refractory purposes. The present invention will therefore be primarily described in respect to the use of the herein described products for refractory purposes, although not intended to be limited thereto.

Above all, a refractory body must possess refractoriness, that is, an ability to stand up under exposure to high temperatures without undue chemical or physical change. Other desirable characteristics sought in a refractory body or shape include an ability to resist sudden changes in temperature without cracking or other manifestations of body breakdown, a satisfactorily high mechanical strength at elevated temperatures as well as at room temperature, chemical inertness and resistance to various corrosive and erosive substances and conditions, a resistance to oxidation, and a density and hardness dependent upon the use to which the refractory body is to be put.

In order to obtain a high degree of perfection in respect of one or more of the above properties peculiarly desirable for the specific refrectory purpose in mind it has usually been found necessary to forego the benefits of maximum performance in respect of certain other desirable properties. Consequently, various refractory compositions exceptionally suitable for one field of use are often found to be entirely unsatisfactory for other purposes. There is, therefore, a continual demand for refractory bodies of new composition which will meet those demands of a special nature which require a combination of properties not to be found in those compositions of a refractory type already available.

It is an object of the present invention to provide bonded boron nitride bodies or shapes of unusual and distinctive compositions and properties.

It is another object of the present invention to provide refractory bodies or shapes having a particular combination of refractory properties heretofore unavailable in refractory compositions.

It is another object to provide bonded boron nitride bodies in which the boron nitride is held together by means of a silicon carbide bond.

It is a further object to provide practical methods for making such articles.

In accordance with the present invention shapes or bodies composed essentially of boron nitride, with or without a silicon carbide filler, and a silicon carbide bond are formed by mixing the boron nitride, with or without a silicon carbide filler, with finely divided silicon metal, with or without the addition of a small amount of temporary binder or plasticizer to provide green molded strength, compressing a mass of the material or forming an article of the desired shape by any of the well-known methods of formation such as pressure molding, tamping, slip-casting, extrusion or the like, drying the formed article and firing it in an atmosphere of carbon monoxide at a temperature and for a period of time sufficient to convert the silicon metal to silicon carbide. If desired, the articles of the present invention after drying can be fired in a carbon monoxide atmosphere throughout the entire firing schedule. The carbon monoxide atmosphere can be obtained by the introduction of carbon monoxide as such from a suitable source of supply or the carbon monoxide can be obtained by using oxygen or carbon dioxide and passing the gas through heated charcoal at a temperature to convert it substantially entirely to carbon monoxide as it is used. However, my preferred practice is to raise the temperature of the article to the desired firing temperature in an atmosphere of helium or other inert gas and after the firing temperature has been reached replacing the inert atmosphere by a carbon monoxide atmosphere for the duration of the firing schedule at the upper temperature ranges of the firing schedule after which the carbon monoxide is replaced again by an inert gas such as helium and the temperature of the article lowered. This latter procedure is preferable because it lessens the development and formation of free carbon in the body of the article.

Although I prefer to fire the herein described bodies of boron nitride in an open controlled atmosphere of carbon monoxide as hereinabove described, the present process can be modified in respect of the firing procedure as follows. The articles to be fired can be fired in methane or other carbonaceous atmosphere which will provide a source of carbon within the articles or they can be embedded in a bed of coke or other granular carbon and fired at the same temperatures used in firing in an open carbon monoxide atmosphere. The air, in passing through the surrounding bed of coke or other carbon, has the oxygen content reduced to carbon monoxide by the time it reaches the embedded bodies, which carbon monoxide reacts with the silicon metal in the body to form silicon carbide. It is noted that the nitrogen of the air likewise passes through the embedding carbon and enters the bodies of the article being fired, but my experience has shown that the reaction of the silicon with the carbon monoxide appears to take preference over the reaction between the silicon and nitrogen at temperatures of 1200–1300° C., so that the formation of silicon carbide predominates, although some lesser formation of silicon nitride might take place.

In order to convert the silicon metal in substantial entirety to silicon carbide the silicon metal should be in the neighborhood of 200 mesh (U.S. Standard Sieve) size or finer. The silicon carbide which is formed in situ from the reaction of the silicon metal with carbon monoxide is of the cubic crystalline variety as identified by X-ray diffraction analyses and serves as an interstitial matrix bond to strongly unite the boron nitride and, when silicon carbide filler is included to unite the silicon carbide also, to provide a body of good mechanical strength. The amount of silicon carbide bond in the final article is not critical and may be determined by the degree of mechanical strength of the finished article required as well as the other properties sought in the final article. As the amount of silicon carbide bond is increased the hardness and mechanical strength of the article is raised. Highly satisfactory bodies have been obtained with the silicon carbide bonding matrix amounting to anywhere from 7% to 77% by weight of the body of the article, which requires the use of 5% to 70% by weight of silicon in the raw batch. Although the silicon carbide bond can be as high as 77% by weight of the article, i.e., 70% by weight of silicon in the raw batch, it is preferable to have the amount of silicon carbide bond no higher than around 49% by weight of the article, i.e., no more than 40% by weight of silicon in the raw batch. At the same time, any proportion of the boron nitride of the body can be replaced by granular silicon carbide as a filler although the body should contain at least 5% by weight of boron nitride. Satisfactory articles can be made with as low as 5% by weight of silicon carbide bonding material.

I have obtained highly satisfactory results by using a commercial grade silicon ground to suitable fineness. Analysis of one commercial grade of silicon which I have satisfactorily used in carrying out the present invention discloses, in addition to the silicon, the presence of the following impurities:

| | Percent |
|---|---|
| Iron | 0.87 |
| Chromium | 0.21 |
| Aluminum | 0.60 |
| Calcium | 0.54 |

The boron nitride used in carrying out the present invention may be a commercial grade of boron nitride material available on the market. However, I prefer to use a boron nitride material made in accordance with the process described in my copending application Serial No. 288,553, filed May 17, 1952. That method can be briefly described as comprising forming a porous pelleted mixture of boric acid or boric oxide and tricalcium phosphate and nitriding the pelleted mixture by heating it in a suitable furnace at around 900° C. in an atmosphere of ammonia for several hours whereby the boric oxide or acid is converted to boron nitride. After the nitriding step the resulting nitrided pellets are crushed and treated with dilute hydrochloric acid to dissolve the tricalcium phosphate and other extraneous material. The undissolved boron nitride after several washings with water is usually treated with hot 95% alcohol solution to further lower the content of oxidic material and dried by allowing to stand overnight at room temperature followed by heating for 2 hours at 300° F. Analysis of the resulting boron nitride is as follows:

| | Percent |
|---|---|
| Boron | 41.45 |
| Nitrogen | 44.00 |
| Free boric acid (calculated as $H_3BO_3$) | .75 |
| Silica | .28 |
| Calcium | Trace |
| Phosphate ($PO_4$) | Trace |
| Material volatile at 110° C. | .26 |
| Extraneous matter | 13.26 |

The 13.26% of extraneous matter in the above table of analysis of the boron nitride product has not been fully identified as to character but insofar as it has been able to be determined it is considered to be for the most part oxygen which is either physically absorbed or united to the boron nitride in such a way that it is not alcohol-soluble as would be the case if it were present in the form of boric oxide. Although the material before being hot pressed into a shaped body does not contain any alcohol-soluble boric oxide, the shaped bodies resulting from hot pressing the material are found to contain a certain amount of free boric oxide. It is therefore concluded that a certain amount of a physically or chemically combined oxygen complex is contained in the original material, although X-ray analyses reveal the presence only of boron nitride. The analysis given above is therefore complete as far as it has been possible to positively identify the composition.

In order that the invention may be clearly understood, the following examples are submitted as illustrative of the compositions for and manner of carrying out the present invention:

EXAMPLE I

Small test bars 1½" x ½" x ¼ to ½" in size, as well as nozzles 1¼ inches in length and ⅞ inch in diameter, were made by molding mixtures of boron nitride and silicon metal, such as those set forth in Table I below, at room temperature and firing the molded shapes in an atmosphere of carbon monoxide for 2 hours at approximately 1400° C.

Two alternative procedures in firing were used. In one, a carbon monoxide atmosphere was maintained throughout the entire heating up and cooling periods as well as during the period of sustained maximum temperature. In the other, the carbon monoxide atmosphere was maintained during the holding period at sustained high temperature only, i.e. 1200° to 1400° C., and preferably above 1300° C., a hydrogen or helium atmosphere being used during the heating up of the article to the holding temperature and again in the course of the cooling of the articles to room temperature.

The products obtained by the two methods differed in some respects. When carbon monoxide is used throughout the entire firing schedule, the weight gain is usually as much as twice that theoretically required to convert the silicon in the molded shape to silicon carbide, and the product is quite dark in color. When an inert atmosphere is used during the heating up and cooling periods, the product is lighter in color and the weight gain is more nearly that calculated for the conversion of the silicon to silicon carbide.

According to X-ray diffraction analyses of the resulting bodies the silicon carbide derived from the silicon in the course of firing was identified as cubic silicon carbide. The dark color and the extra weight gain obtained when the article is fired with carbon monoxide atmosphere throughout the heating and cooling periods as well as the sustained high temperature period of firing is considered to be due at least in part to the deposition of free carbon within the article.

Table I below sets forth the composition and fabricating data and also some of the physical properties for a number of bar-shaped test pieces made in accordance with the present invention. These test bars set forth in Table I were 1½" in length x ½" wide and approximately .3 inch thick and were pressed at 30,000 pounds per square inch using five percent "Carbowax" No. 4000 as a temporary binder. According to the "Hand Book of Material Trade Names" by Zimmerman and Lavine (published by Industrial Research Service, Dover, New Hampshire, 1953), page 110, "Carbowax" is a group of non-volatile, solid polyethylene glycols, soluble in both water and aromatic hydrocarbons. They resemble natural waxes in appearance and texture, but are soluble in a much wider range of solvents. Their aqueous solutions possess binding properties. The same source of authority states that "Carbowax" No. 4000 is a hard, waxy solid having specific gravity of 1.2, freezing range of 50–55° C., a flash point greater than 475° F., and a Saybolt viscosity of 500–700 seconds at 210° F. The boron nitride and silicon metal in finely divided form were intimately mixed. To the mixture of boron nitride and silicon metal was added 5% by weight of the total mass of "Carbowax" as a temporary binder and the resulting mixture molded to the desired shape. The temporary binder was removed by heating the molded bodies for a few hours at 300–400° C. The resulting shapes were then fired at 1400° C. for a sufficient period of time to convert the silicon in the body to silicon carbide. The atmosphere during the heating up and cooling phases of the firing schedule was either carbon monoxide or hydrogen as prescribed in Table I.

*Table I*

BAR SHAPED COMPACTS OF MIXTURES OF BORON NITRIDE AND SILICON FIRED IN CARBON MONOXIDE FOR TWO HOURS AT 1400° C.

| Experiment No. | Raw Mix Composition, percent by weight | Atmosphere during heating up and cooling periods | Weight gain, percent | Apparent density, g./cc. | Sandblast penetration,[1] inches |
|---|---|---|---|---|---|
| 1 | 90 BN; 10 Si | carbon monoxide | 15.0 | | .013 |
| 2 | 85 BN; 15 Si | do | 16.2 | | .007 |
| 3 | 80 BN; 20 Si | do | 17.4 | 1.78 | .008 |
| 4 | 75 BN; 25 Si | do | 20.3 | | .007 |
| 5 | 80 BN; 20 Si | hydrogen | 7.8 | 1.67 | .014 |
| 6 | 80 BN prefired in NH₃ at 1,400° C.; 20 Si | carbon monoxide | 19.3 | 1.78 | .030 |
| 7 | 80 BN prefired in NH₃ at 1,400° C.; 20 Si | hydrogen | 9.6 | 1.53 | .027 |
| 8 | 65 BN prefired in NH₃ at 1,400° C.; 35 Si | do | 18.2 | 1.72 | .015 |

[1] Standard penetration on plate glass when subject to the same penetration test is .010 of an inch.

The effect of the atmosphere used during the heating up and cooling periods can be readily seen by a comparison of the difference in weight gains between the experimental bars 3 and 5 and also the comparison between the weight gains of bars 6 and 7 of the above table. It is noted that when carbon monoxide is used throughout the entire firing schedule the bars gain more in weight during firing, are of higher apparent density and are somewhat harder. The reasons for these differences are not fully understood, although, as previously suggested, it is believed that free carbon is formed in those bodies fired in carbon monoxide for the entire schedule.

The boron nitride used in making experimental bars 6, 7 and 8 was prefired in an ammonia atmosphere for 8 to 14 hours at 1400° C. before being mixed with the silicon. The resulting fired compacts are softer than those bars in which untreated boron nitride was used. It was also noted that compacts or bars embodying prefired boron nitride expanded more in firing than bars made from untreated boron nitride.

I have further found that when the boron nitride is prefired prior to its mixture with silicon and further firing that the resulting article has a somewhat higher resistance to heat shock.

Nozzles 1¼ inches in length and ⅞ inch in diameter were made from mixtures of boron nitride and silicon as follows. The composition of these and the atmosphere maintained in the furnace during the heating up and cooling periods were as follows:

| Nozzle No. | Raw Mix Composition | | Atmosphere |
|---|---|---|---|
| | Boron Nitride, Percent by Weight | Silicon Percent by wt. | |
| 1 | 80 | 20 | Carbon Monoxide. |
| 2 | 80 | 20 | Helium. |
| 3 | 60 | 40 | Helium. |

The nozzles were formed, previous to firing, by pressing at 8,000 to 10,000 pounds per square inch with fifteen percent of "Carbowax" No. 4000 as a temporary binder. The approximate apparent densities of the fired nozzles were as follows:

No. 1 had a density of 1.68 grams per cubic centimeter;
No. 2 had a density of 1.54 grams per cubic centimeter; and
No. 3 had a density of 1.68 grams per cubic centimeter.

EXAMPLE II

Rocket nozzles 1¼ inches in length and ⅞ inch in diameter were made in accordance with a modified form of the present invention wherein a silicon carbide filler was included in the composition from which the article was made, in accordance with the following mixture:

Percent by weight
Silicon carbide (400 grit mesh size) _____ 40
Silicon (10 microns and finer) _____ 40
Boron nitride _____ 20

The nozzles were molded at 8,000 to 10,000 pounds per square inch pressure with fifteen percent of "Carbowax" No. 4000 as a temporary binder. The pieces were fired for two hours at 1400° C. in an atmosphere of carbon monoxide at the sustained high temperature, a helium atmosphere being used during the heating up period and also during the cooling of the articles after the two hour firing period. The fired nozzles had an apparent density of 1.95 grams per cubic centimeter. They were strong and hard and a uniform dark grayish black color in appearance.

While I have described in the above examples the making of various molded shapes in which the article is molded and fired in the exact shape or form in which it is intended for use, the present invention is not intended to be so restricted. Another way of making and using silicon carbide bonded boron nitride bodies of the present invention is to mold the raw batch of material into briquettes or other shapes or otherwise compress a mass of the material having a composition in the desired proportions, after which the resulting briquettes or compressed bodies are fired in the manner already described. After removal from the furnace, they are crushed to granular form of the desired grit size. The resulting granular material can then be used in loose granular form as a high temperature insulation material, as, for example, insulation around jet engines and rocket combustion chambers, or as a layer of insulation around industrial furnace chambers. It may also be used as a loose filtering media or as a catalyst or catalyst carrier material. The granular material can also be bonded by means of sintered metals, vitreous or ceramic bonds or other bonding materials to form articles suitable for many of the industrial uses set forth elsewhere herein.

Likewise, articles or bodies can be made in accordance with the present invention in which pore-forming materials are incorporated in the raw batch from which the body is made for the purpose of providing a greater degree of porosity in the final body. Pore-forming material such as carbon and the like, which requires oxidation for removal from a body would require a preliminary burning out of the pore-forming material at lower temperatures. Therefore, the pore-forming material preferably should be a material which is removed by volatilization during the drying and/or firing operation such as powdered or granular naphthalene, various organic resinous materials such as phenolic resins and the like or one which provides pores by reason of the generation of a gas. The resulting bodies, which have greater porosity than those made with no pore formers, are particularly useful in the fabrication of porous filtering media, catalysts and catalyst carriers, insulation bodies and the like, whether in crushed granular form or in the form of molded shapes of predetermined contour.

It is to be understood that the products of the present invention in its various modifications are not limited to any specific field or fields of use such as might be defined by the specific examples previously set forth. The products can be made in any desired shape as well as provided in granular or aggregate form. They are, therefore, not only suited for many of the uses for which industrial refractories are required, including bricks, blocks, setter tile, muffles, kiln furniture and special shapes for application in and around furnaces and other high temperature equipment, but they are also well suited for many specialty high temperature applications, such as jet engine combustion chambers, linings for exhaust nozzles, rocket combustion chambers and exhaust nozzles, turbine blades, stator blades, lens fusion blocks, spark plug bodies, and the like. The bodies are also suitable for making crucibles and other laboratory ware or industrial structural articles or parts for the handling of corrosive chemicals such as molten cryolite or other fused halides. They are also suitable for the fabrication of laboratory ware, including combustion boats, crucibles, burner holders, and other shapes. The bodies of the present invention, particularly when modified by the use of pore formers in the raw batch from which the bodies are made, are also highly useful as diffustion filtering media, such as diffusion tubes and plates, filtering tubes, plates and shapes, or as catalysts or catalyst carriers, radomes for guided missiles, etc. Materials and articles of the present invention can also be used for making abrasive articles such as grinding wheels, sharpening stones, razor hones, and other grinding and polishing shapes and materials. The present bodies offer possible applications in the electrical and radio industry including supports in electric light bulbs, radio tubes, X-ray tubes and radar equipment, resistors and grid leaks.

Having described the present invention it is desired to claim:

1. A method of making bonded boron nitride articles of manufacture which comprises forming an article of the desired shape from a mixture consisting essentially of boron nitride particles and 5% to 70% by weight of finely divided silicon, and heating said article in an atmosphere of carbon monoxide at a temperature sufficient to react the carbon monoxide of the atmosphere with the silcon to form silicon carbide and thereby bond the boron nitride particles together.

2. A method of making bonded boron nitride articles of manufacture which comprises forming an article of the desired shape from a mixture consisting essentially of boron nitride particles, silicon carbide particles and 5% to 70% by weight of finely divided silicon, and heating said article in an atmosphere of carbon monoxide at a temperature sufficient to react the carbon monoxide of the atmosphere with the silicon and form silicon carbide and thereby bond the boron nitride particles together.

3. A method of making bonded boron nitride articles of manufacture which comprises forming an article of the desired shape from a mixture consisting essentially of boron nitride particles and 5% to 70% by weight of finely divided silicon, and heating said article in an atmosphere of carbon monoxide at a temperature of 1200° to 1400° C.

4. A method of making bonded boron nitride articles of manufacture which comprises forming an article of the desired shape from a mixture consisting essentially of boron nitride particles and 5% to 70% by weight of finely divided silicon, heating said article up to a temperature of around 1300° C. in an inert atmosphere, replacing the inert atmosphere with a carbon monoxide atmosphere, holding the article above 1300° C. in said atmosphere of carbon monoxide for a period of time to convert the silicon in the article to silicon carbide, replacing the carbon monoxide atmosphere with an inert atmosphere and lowering the temperature of the article.

5. A method of making bonded boron nitride articles of manufacture which comprises forming an article of the desired shape from a mixture consisting essentially of boron nitride particles and 5% to 70% by weight of finely divided silicon, heating said article up to a temperature of around 1300° C. in an atmosphere of helium, replacing the helium by carbon monoxide and holding the article above 1300° C. in an atmosphere of carbon monoxide for a period of time to convert the silicon in the article to silicon carbide, replacing the carbon monoxide atmosphere with an atmosphere of helium and lowering the temperature of the article.

6. A method of making bonded boron nitride articles of manufacture which comprises forming an article of the desired shape from a mixture consisting essentially of boron nitride particles and 5% to 70% by weight of finely divided silicon, and disposing said article in an environment providing carbon to react with said silicon, and heating said article to a temperature sufficient to react the carbon with the silicon to form silicon carbide thereby to bond the boron nitride particles together.

7. A method of making bonded boron nitride articles of manufacture which comprises forming an article of the desired shape from a mixture consisting essentially of boron nitride particles and 5% to 70% by weight of finely divided silicon, embedding said article in a mass of granular carbon, and firing the article while so embedded at a temperature of 1200° to 1400° C.

8. A method of making bonded boron nitride articles of manufacture which comprises forming an article of the desired shape from a mixture consisting essentially of boron nitride particles, granular silicon carbide and 5% to 70% by weight of finely divided silicon, embedding said article in a mass of granular carbon, and firing the article while so embedded at a temperature of 1200° to 1400° C.

References Cited in the file of this patent

UNITED STATES PATENTS

| | | |
|---|---|---|
| 2,108,794 | Boyer et al. | Feb. 22, 1938 |
| 2,109,246 | Boyer et al. | Feb. 22, 1938 |
| 2,119,489 | Beer | May 31, 1938 |
| 2,431,327 | Geiger | Nov. 25, 1947 |
| 2,609,318 | Swentzel | Sept. 2, 1952 |
| 2,636,825 | Nicholson | Apr. 28, 1953 |
| 2,636,826 | Nicholson | Apr. 28, 1953 |

FOREIGN PATENTS

| | | |
|---|---|---|
| 478,016 | Great Britain | Jan. 11, 1938 |